US010641917B2

(12) United States Patent
Donderici et al.

(10) Patent No.: US 10,641,917 B2
(45) Date of Patent: *May 5, 2020

(54) PIPE AND BOREHOLE IMAGING TOOL WITH MULTI-COMPONENT CONFORMABLE SENSORS

(71) Applicant: HALLIBURTON ENERGY SERVICES, INC., Houston, TX (US)

(72) Inventors: Burkay Donderici, Houston, TX (US); Luis San Martin, Houston, TX (US); Dagang Wu, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 21 days.

This patent is subject to a terminal disclaimer.

(21) Appl. No.: 14/888,825

(22) PCT Filed: Sep. 30, 2014

(86) PCT No.: PCT/US2014/058297
§ 371 (c)(1),
(2) Date: Nov. 3, 2015

(87) PCT Pub. No.: WO2015/050866
PCT Pub. Date: Apr. 9, 2015

(65) Prior Publication Data
US 2016/0084982 A1 Mar. 24, 2016

Related U.S. Application Data

(60) Provisional application No. 61/886,183, filed on Oct. 3, 2013.

(51) Int. Cl.
*G01V 3/30* (2006.01)
*E21B 47/09* (2012.01)
(Continued)

(52) U.S. Cl.
CPC ............... *G01V 3/30* (2013.01); *E21B 47/00* (2013.01); *E21B 47/0002* (2013.01);
(Continued)

(58) Field of Classification Search
CPC .... E21B 47/00; E21B 17/1021; E21B 47/011; E21B 47/0002; E21B 17/1014; E21B 17/1057
See application file for complete search history.

(56) References Cited

U.S. PATENT DOCUMENTS 4,641,724 A * 2/1987 Chow ...................... G01V 1/44
181/104
4,780,678 A * 10/1988 Kleinberg ................ G01V 3/28
324/338

(Continued)

OTHER PUBLICATIONS

Neil Goldfine, "Surface-Mounted Eddy-Current Sensors for On-Line Monitoring of Fatigue Tests and for Aircraft Health Monitoring", Second Joint NASA/FAA/DoD Conference on Aging Aircraft, Aug. 1998.

(Continued)

*Primary Examiner* — Kam Wan Ma
(74) *Attorney, Agent, or Firm* — Benjamin Fite; Baker Botts L.L.P.

(57) ABSTRACT

An example downhole tool incorporating aspects of the present disclosure may include a tool body and a first flexible material coupled to the tool body. A transmitter may be coupled to the first flexible material. A receiver may coupled to the first flexible material, with the receiver having at least two antenna windings positioned in different orientations. A control unit may be communicably coupled to the transmitter and the receiver, the control unit having a processor and a memory device coupled to the processor, the memory device containing a set of instruction that, when executed by the processor, cause the processor to generate an (Continued)

electromagnetic signal in a downhole element using the transmitter, and measure a response of the downhole element to the electromagnetic signal using the at least two antenna windings of the receiver.

19 Claims, 7 Drawing Sheets

(51) Int. Cl.
*G01V 3/18* (2006.01)
*G01V 3/26* (2006.01)
*E21B 47/00* (2012.01)
*E21B 47/12* (2012.01)

(52) U.S. Cl.
CPC ........ *E21B 47/0905* (2013.01); *E21B 47/122* (2013.01); *G01V 3/18* (2013.01); *G01V 3/26* (2013.01)

(56) References Cited

U.S. PATENT DOCUMENTS

| | | | | |
|---|---|---|---|---|
| 4,852,069 | A * | 7/1989 | Clerke | E21B 17/1021 181/105 |
| 5,022,484 | A * | 6/1991 | Panetta | E21B 17/1021 181/102 |
| 5,095,272 | A * | 3/1992 | Sinclair | G01V 3/28 324/339 |
| 5,375,668 | A * | 12/1994 | Hallundbaek | E21B 4/02 175/19 |
| 5,914,862 | A * | 6/1999 | Ferguson | G06K 19/04 340/572.7 |
| 6,697,298 | B1 * | 2/2004 | Dubinsky | E21B 47/16 340/854.4 |
| 6,784,666 | B2 * | 8/2004 | Andreasen | G01V 3/30 324/220 |
| 7,066,282 | B2 * | 6/2006 | Chen | G01V 3/24 166/250.11 |
| 7,420,367 | B2 * | 9/2008 | Bespalov | E21B 47/0002 324/303 |
| 8,098,070 | B2 | 1/2012 | Lopez et al. | |
| 8,378,908 | B2 * | 2/2013 | Wisler | G01V 3/28 324/338 |
| 8,776,878 | B2 * | 7/2014 | Bloemenkamp | G01V 3/24 166/250.01 |
| 8,830,065 | B1 * | 9/2014 | Stanford | G06K 7/0008 340/10.1 |
| 9,341,053 | B2 * | 5/2016 | Donderici | E21B 47/102 |
| 2003/0051914 | A1 | 3/2003 | Bittar | |
| 2003/0090269 | A1 * | 5/2003 | Fanini | G01V 3/28 324/339 |
| 2005/0212520 | A1 * | 9/2005 | Homan | G01V 3/30 324/338 |
| 2006/0161351 | A1 | 7/2006 | Nickel et al. | |
| 2007/0114021 | A1 * | 5/2007 | Brown | E21B 36/001 166/250.1 |
| 2007/0159351 | A1 * | 7/2007 | Madhavan | E21B 17/003 340/855.1 |
| 2007/0275173 | A1 * | 11/2007 | Lawson | B09B 1/00 427/386 |
| 2009/0051538 | A1 * | 2/2009 | Knoll | G06K 19/07749 340/572.7 |
| 2009/0055135 | A1 * | 2/2009 | Tang | E21B 10/00 703/1 |
| 2009/0199630 | A1 * | 8/2009 | DiFoggio | E21B 47/123 73/152.28 |
| 2010/0177310 | A1 * | 7/2010 | DiFoggio | E21B 47/00 356/326 |
| 2011/0001481 | A1 * | 1/2011 | Forgang | G01V 3/28 324/339 |
| 2011/0079391 | A1 * | 4/2011 | Bedouet | E21B 47/011 166/302 |
| 2011/0138903 | A1 * | 6/2011 | Large | E21B 17/1021 73/152.17 |
| 2011/0309836 | A1 * | 12/2011 | Bittar | G01V 3/26 324/339 |
| 2012/0247198 | A1 * | 10/2012 | Durbec | G01V 1/40 73/152.02 |
| 2013/0234717 | A1 * | 9/2013 | Wang | G01V 3/10 324/339 |
| 2014/0015480 | A1 * | 1/2014 | Cheikh | H04B 5/0037 320/108 |
| 2014/0284050 | A1 * | 9/2014 | Jacob | E21B 47/011 166/250.01 |
| 2014/0347056 | A1 * | 11/2014 | Hayman | E21B 47/00 324/355 |
| 2014/0350858 | A1 * | 11/2014 | Donderici | E21B 7/04 702/7 |
| 2015/0167402 | A1 * | 6/2015 | Chang | E21B 17/1014 175/45 |
| 2015/0285057 | A1 * | 10/2015 | Donderici | E21B 47/102 73/152.54 |
| 2015/0378046 | A1 * | 12/2015 | Donderici | E21B 47/0002 324/339 |
| 2016/0084982 | A1 * | 3/2016 | Donderici | G01V 3/18 340/854.6 |
| 2016/0090835 | A1 * | 3/2016 | Sethi | E21B 47/0905 324/338 |
| 2016/0175600 | A1 * | 6/2016 | Amir | A61N 1/3787 607/5 |
| 2016/0202381 | A1 * | 7/2016 | Hill | G01V 3/18 324/338 |

OTHER PUBLICATIONS

Neil Goldfine et al, "Conformable Eddy-Current Sensors and Arrays for Fleetwide Gas Turbine Component Quality Assesment", ASME Journal of Engineering for Gas Turbines and Power, vol. 124, No. 4, pp. 904-909, Oct. 2002.

Neil Goldfine, "MWM-Array Eddy Current Sensors for Detection of Cracks in Regions with Fretting Damage", ASNT Materials Evaluation, Jul. 2002, vol. 60, No. 7.

International Search Report and Written Opinion issued in related PCT Application No. PCT/US2014/058297 dated Jan. 8, 2015, 16 pages.

* cited by examiner

PIPE AND BOREHOLE IMAGING TOOL WITH MULTI-COMPONENT CONFORMABLE SENSORS

CROSS-REFERENCE TO RELATED APPLICATION

The present application is a U.S. National Stage Application of International Application No. PCT/US2014/058297 filed Sep. 30, 2014, and claims priority to U.S. Provisional Patent Application No. 61/886,183, filed Oct. 3, 2013 and titled "PIPE AND BOREHOLE IMAGING TOOL WITH MULTI-COMPONENT CONFORMABLE SENSORS," both of which are incorporated herein by reference in their entirety for all purposes.

BACKGROUND

The present disclosure relates generally to downhole drilling operations and, more particularly, to pipe and borehole imaging tools with multi-component conformable sensors. Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation. In certain operations, measurements within the wellbore may be generated. Typically, those measurements are limited with respect to their granularity, and small features within the wellbore may not be identifiable through the measurements.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features.

Figure 1:
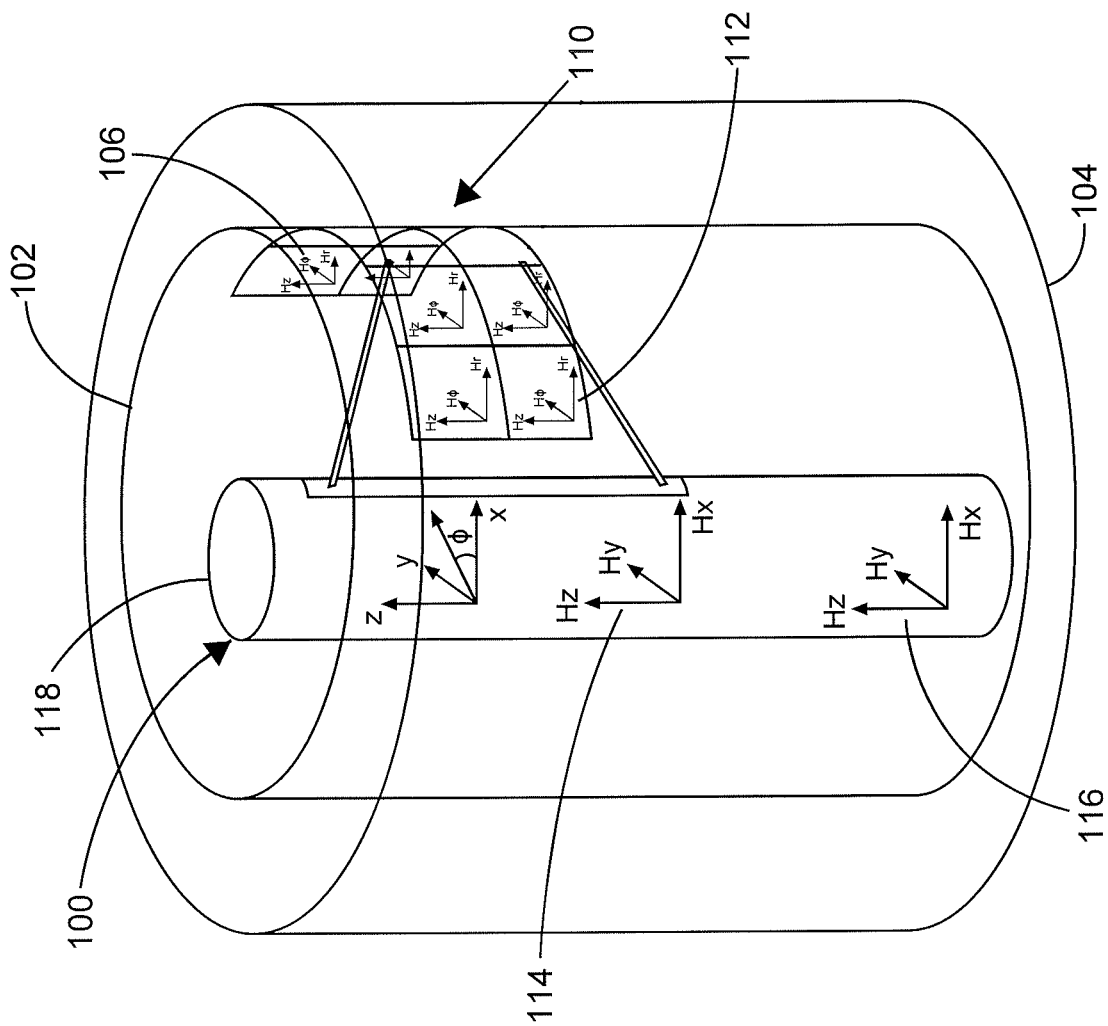
FIG. 1 is a diagram of an example downhole tool with conformable sensors, according to aspects of the present disclosure.
Figure 1:
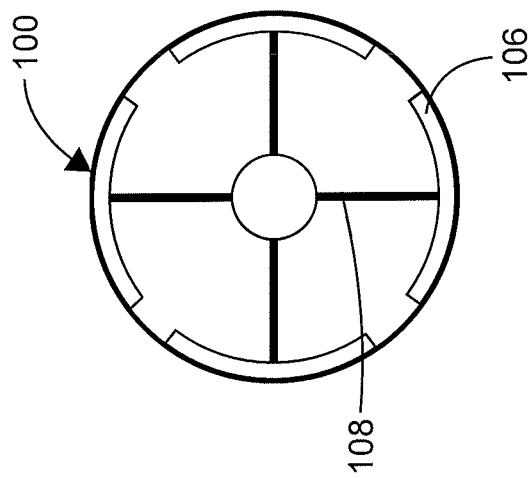

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to downhole drilling operations and, more particularly, to pipe and borehole imaging tools with multi-component conformable sensors.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Modern petroleum drilling and production operations demand information relating to parameters and conditions downhole. Several methods exist for downhole information collection, including logging-while-drilling ("LWD") and measurement-while-drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

Figure 7:
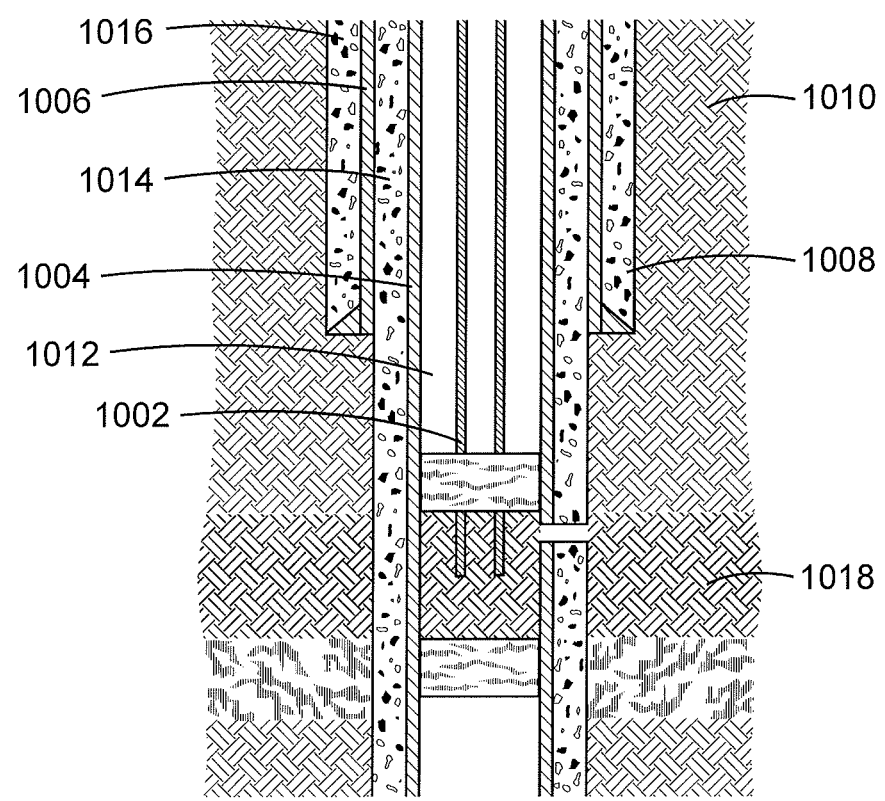
FIG. 7 is a diagram of an example production environment with multiple, concentric pipes.

Hydrocarbons may be trapped in porous rock formations thousands of feet below the surface. Recovering the hydrocarbons typically requires drilling a borehole into the porous rock formation so that the hydrocarbons may be pumped to the surface. Metal pipes, referred to as casings, may be secured within the borehole as part of the hydrocarbon recovery operation. FIG. 7 is a diagram of an example production environment and illustrates casings 1002, 1004, and 1006 disposed within a borehole 1008 in a rock formation 1010. The casings 1002-1006 may be concentric or nearly concentric and secured within the borehole 1008 and each other through cement layers 1012, 1014, and 1016. The center casing 102 may comprise a production casing where hydrocarbon from the formation strata 1018 is received at the surface (not shown).

The casings 1002-1006 may serve numerous purposes within a production and drilling environment, including preventing the borehole 1008 from collapsing after it is drilled and while it is being drilling, protecting a water table in the formation 1010 from contamination, and maintaining pressure within the borehole 1008. Accordingly, damage to the integrity of the casings 1002-1006 is problematic. Common damage to the casings includes crack and corrosion, which can be an indication of a defective cement bond between a casing and the borehole wall.

According to aspects of the present disclosure, a downhole tool with at least one multi-component conformable sensor may be positioned proximate to downhole elements in either an open hole (non-cased) environment, or in a cased environment. Example downhole elements include casings, boreholes, and formations. As used herein, multi-component conformable sensors may comprise planar sensors that are printed or disposed on a material that can conform to the shape of a surface with which it is in contact, and that may include tilted coils or antenna windings that are oriented in at least two different directions. As will be described below, the conformable nature of a multi-component conformable sensor may allow for a high resolution, azimuthally sensitive measurement that covers different orthogonal directions with respects to a targeted downhole element and provides an improved visualization of the downhole element.

FIG. 1 is a diagram that shows two views of an example downhole tool 100 with at least one multi-component conformable sensor 112, according to aspects of the present disclosure. The downhole tool 100 is shown deployed in concentric pipes 102 and 104, such as in a cased environment. In certain embodiments, the downhole tool 100 may comprise a wireline survey or measurement tool that can be introduced into an open hole (non-cased) environment, a cased environment, or within the bore of a drill string in a conventional drilling assembly. In certain embodiments, the downhole tool 100 may be included in a LWD/MWD segment of a bottom hole assembly (BHA) in a conventional drilling assembly. The tool 100 may be physically and/or communicably coupled to a control unit (not shown) at the surface through a wireline or slickline, or any other conveyance, or through a downhole telemetry systems, such as a mud pulse telemetry system. The tool 100 may also comprise a control unit that is communicably coupled to the conformable sensor 112 of the tool. As used herein, a control unit may include an information handling system or any other device that contains at least one processor communicably coupled to a non-transitory computer readable memory device containing a set of instructions that when executed by the processor, cause it to perform certain actions. Example processors include microprocessors, microcontrollers, digital signal processors (DSP), application specific integrated circuits (ASIC), or any other digital or analog circuitry configured to interpret and/or execute program instructions and/or process data.

At least one multi-component conformable sensor 112 may be coupled to a tool body 118 of the downhole tool 100. The multi-component conformable sensor 112 may include primary windings or transmitters having extended portions for creating an electromagnetic (EM) field in a target, in this case the pipe 102, and a plurality of orthogonally-oriented secondary windings or receivers within to measure the current response of the target to the generated EM field. The measured current responses may be processed to identify physical and electrical parameters of the pipes 102 and 104. The resolution of the measurements taken by the conformable sensor 112 increases as the "stand-off" distance between the sensor 112 and the target decreases.

In the embodiment shown, the multi-component conformable sensors 112 is one of an array 110 of multi-component conformable sensors disposed on an pad 106 that is coupled to and extendable from the tool body 118 through spring mechanisms or motorized arms 108 to contact the pipe 102. The spring mechanisms or motorized arms 108 may similarly establish contact between the pad 106 and a borehole wall in an open hole environment. The array of multi-component conformable sensors may be arranged in both longitudinal and horizontal directions on the pad 106 to enable/enhance tool sensitivity to both longitudinal and horizontal cracks and corrosions in the casing pipe.

The elasticity of the pad 106 and tension in the arm 108 may be designed in such a way that the pad 106 will substantially deform to the shape of the pipe 102, increasing the resolution of the resulting measurements. Other pads similar to pad 106 may be arranged on different sides of the tool 100 to mechanically balance the tool 100 within the pipe 102. In other embodiments, expandable arms may be used opposite the pad 106 to mechanically balance the tool 100. In certain embodiments, the array 110 of conformable sensors may be arranged on the pad 106 to perform sensing at different azimuthal positions with respect to the tool body 118. In embodiments where multiple pads are used, each pad may include an array of conformable sensors to perform sensing at different azimuthal positions, and the pads may be arranged with respect to the tool body 118 such that there is full 360 degree coverage around the tool 100, where one pad covers one set of angles, and other stations cover other sets, providing full coverage.

As stated above, the conformable sensor 112 may include at least one portion that functions as a transmitter and generate electromagnetic (EM) fields in a target, such as the pipe 102, and at least one portion that functions as a receiver that receives and measures the current responses of the target to the generated EM fields. In certain embodiments, the downhole tool 100 may comprise separate transmitters 114 or receivers 116 mounted on the tool body 118. These additional transmitters 114 or receivers 116 may be inductive-type antennas, realized with coils, solenoids or rotating or moving magnets. In certain embodiments, EM fields may be generated and the corresponding current responses measured with any combination of the transmitter 114, the receiver 112, and the transmitters and receivers within the multi-component conformable sensor 112. Notably, when the transmitter is farther away from the receiver, the depth of investigation increases but the measurement resolution decreases.

In use, the downhole tool 100 may generate high resolution measurements of the pipe 102 by placing the pad 106 in contact with the pipe 102 and transmitting a time-varying EM signal from a transmitter of the multi-component conformable sensors 112. The signal may generate eddy currents in the pipe 102. The eddy currents may generate secondary currents that contain information about the parameters of the pipes 102, and the secondary currents may be measured at one or more receivers of the multi-component conformable sensor 112. Conversely, the downhole tool 100 may generate low-resolution measurements of the pipe 104 by transmitting a time-varying EM signal from transmitter 114 and measuring the current response of the pipe 104 at one or more receivers of the multi-component conformable sensor 112.

Figure 2:
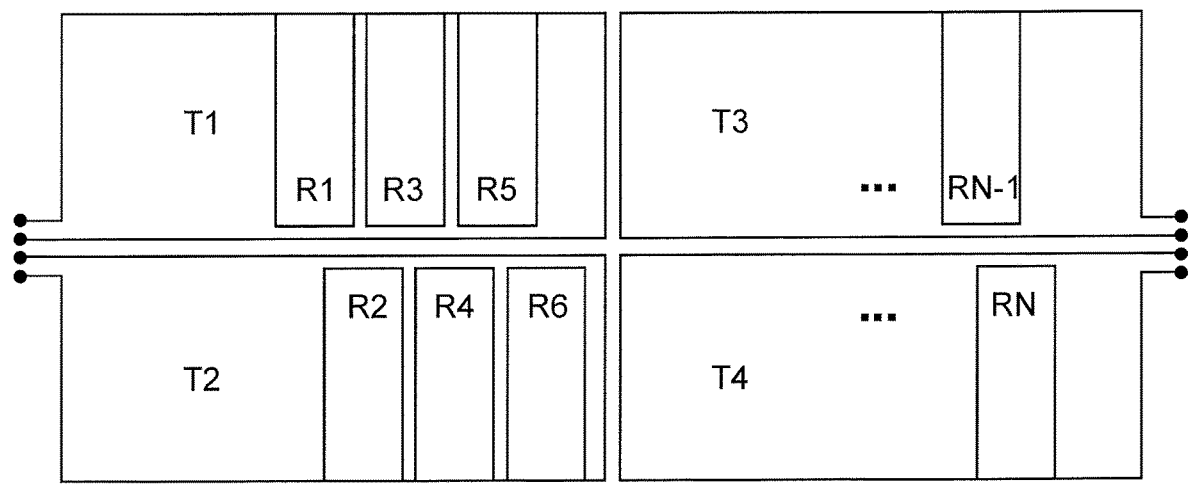
FIG. 2 is a diagram of example antenna windings for a multi-component conformable sensor, according to aspects of the present disclosure.

FIG. 2 is a diagram of example antenna configuration for a multi-component conformable sensor, according to aspects of the present disclosure. The configuration shown may comprise a single multi-component conformable sensor and may be formed by circuit printing or other deposition methods on a flexible surface (not shown). As can be seen, the windings include transmitters T1-T4 and staggered multi-component receivers R1-RN. The number and size of the receiver pairs may determine the granularity and resolution of the measurements. As will be described below, each of the multi-component receivers R1-RN may comprise antenna windings oriented in at least two orthogonal directions, arranged in a planar, flexible structure. Staggering the receivers may double the azimuthal resolution of the sensor since more measurements are made per azimuthal position. Although one example configuration for a multi-component conformable sensor is shown in FIG. 2, other configurations are possible. For example, the size, number, and relative positions of the transmitters T1-T4 and the multi-component receivers R1-RN may be altered, as can the relative orientations of the transmitters T1-T4 and the multi-component receivers R1-RN.

Ports of the transmitters T1-T4 (shown as circles) and ports of the receivers R1-RN (not shown) may be electrically connected to transmitter and receiver boards (not shown) that cause the transmitters T1-T4 to generate signals and cause the receivers R1-RN to measure the current responses caused by the generated signals. In certain embodiments, one or more of the transmitters T1-T4 may generate a signal, and each of the receivers R1-RN may separately measure the response to the signal. In certain embodiments, the combinations of transmitters and receivers used to generate EM signals and measure current responses may be varied dynamically by a control unit coupled to the transmitters T1-T4 and receivers R1-RN.

Figure 3:
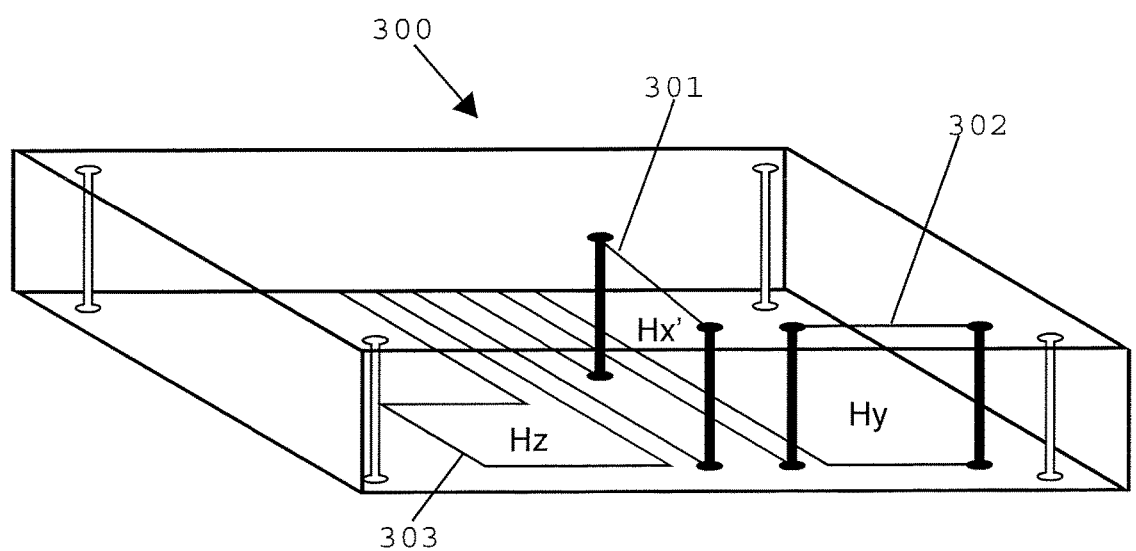
FIG. 3 is a diagram of example antenna windings for a multi-component receiver, according to aspects of the present disclosure.

FIG. 3 is a diagram of an example multi-component receiver 300 for a multi-component conformable sensor, according to aspects of the present disclosure. In certain embodiments, a multi-component receiver 300 may be incorporated at each location of receivers R1-RN in FIG. 2. The multi-component receiver 300 comprises three separate antenna winding 301-303, each arranged in a different orthogonal direction—Hz, Hy, and Hx', respectively—to independently measure the different orthogonal components of a signal response. The orientation of a winding may comprise the direction that is normal to the plane that contains a winding. In certain embodiments, the receiver 300 may be printed or otherwise disposed on one or more flexible boards, similar to the whole conformable sensor, with the separate antenna winding 301-303 printed on two sides of the same flexible board, or on two parallel flexible boards. A similar configuration may be used for transmitting antennas, and a combination of multi-component transmitters and multi-component receivers can be used to take a large number of measurements each transmitter to each receiver.

The use of multiple sensor windings at each receiver location increases the amount of information received at each location, which may, in turn, increase the resolution of images of a downhole elements generated using the measurements, as will be described below. Additionally, by using orthogonally distinct antenna winding 301-303, more diverse information can be gathered and used to solve for parameters associated with geometrical features of the downhole elements. Although FIG. 3 is directed to a receiver structure, a similar structure can be used to build a transmitter. Additionally, alternative configurations of multi-component antennas on a single board or dual boards are possible.

Figure 4:
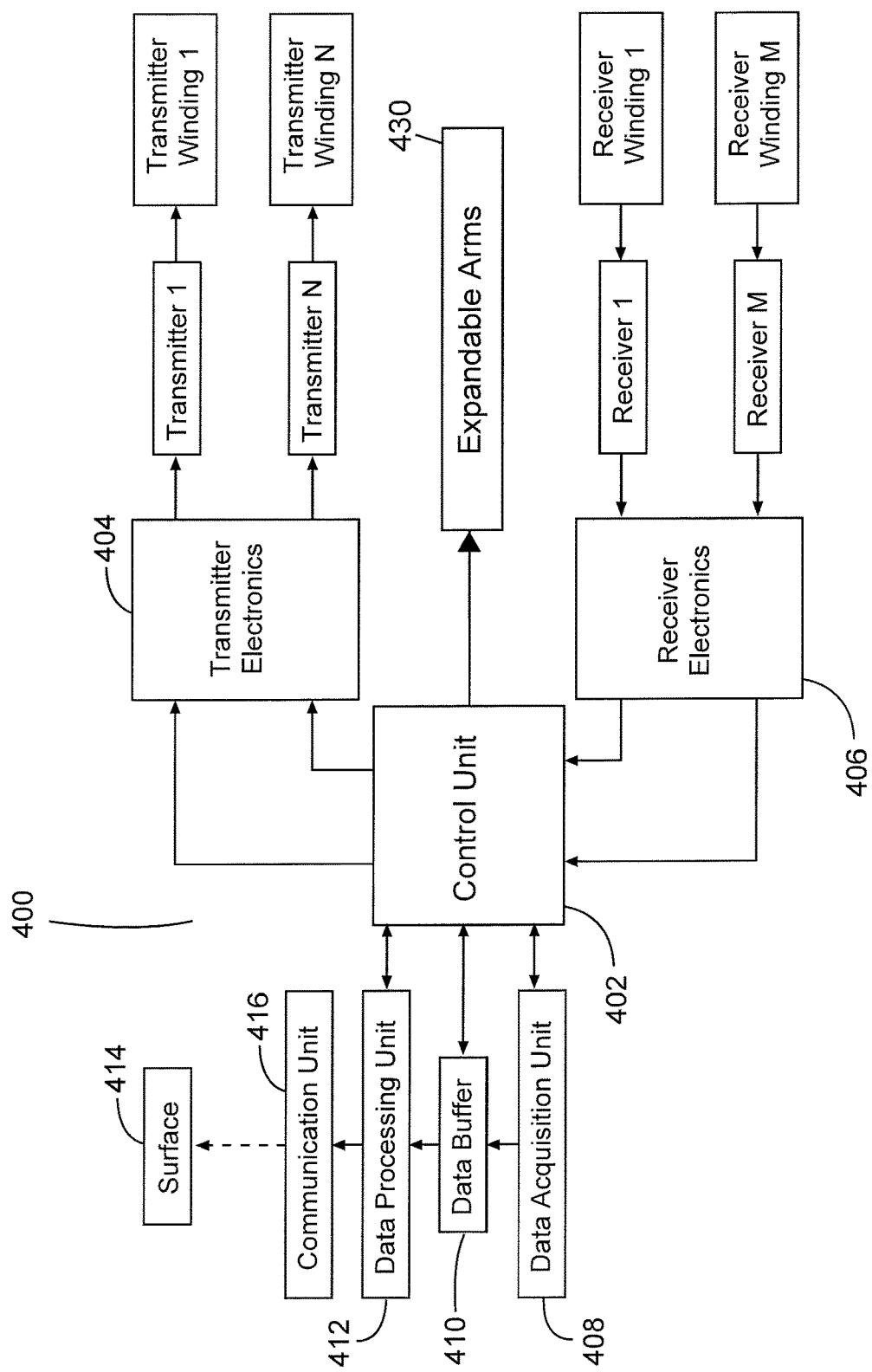
FIG. 4 is a diagram of an example control system for a downhole tool, according to aspects of the present disclosure.

In certain embodiments, a downhole tool with conformable sensors may comprise a control system to control when and how the signals are transmitted and the responses are measured. FIG. 4 is a diagram of an example control system 400 for a downhole tool with a conformable sensor, according to aspects of the present disclosure. The system 400 comprises a control unit 402 that may function as the primary controller for the tool and may be communicably coupled to transmitters 1-N through transmitter electronics 404, to receivers 1-M through receiver electronics 406, and to mechanical, electrical or hydraulic elements 430 coupled to and configured to extend pads to which the transmitters 1-N and receivers 1-M coupled. The transmitters 1-N and receivers 1-M may comprise elements of a multi-component conformable sensor or an array of multi-component conformable sensors. For example, each of the receivers 1-M may comprise one multi-component receiver, or the receivers 1-M may correspond to each orthogonally-oriented receiver in a multi-component conformable sensors. The transmitter electronics 404 and receiver electronics 406 may comprise circuit boards to which some or all of the transmitters 1-N and receivers 1-M are coupled.

The control unit 402 may trigger the transmitter electronics 404 to generate a time-varying EM signal through one or more of the transmitters 1-N. The time-varying signal may be a sinusoidal signal, its phase and amplitude set at a desired value. As is described above, the signals generated through the transmitters 1-N may be coupled to and generate eddy currents in a downhole elements, such as a pipe of borehole, that is in immediate contact with the multi-component conformable sensors, as well as downhole elements located away from the multi-component conformable sensors, such as outer concentric pipes. The eddy currents may generate secondary currents that contain information about pipes. The secondary currents generated by one or more of the transmitters 1-N of the conformable sensor array may be measured at the receivers 1-M. In the case of a frequency domain operation, the measurements from the receivers 1-M may be represented as voltage or current numbers in complex domain with real and imaginary parts, in phasor domain as amplitude and phase, or any other domain that can be obtained by analytical mapping from any of these domains. In the case of a time domain operation, the measurements from the receivers 1-M may be represented as magnitudes as a function of time which can be positive or negative. Results from time and frequency domain can be transferred from one to another by using Fourier transform or inverse Fourier transform.

The control unit 402 may receive the measurements from the receivers 1-N through the receiver electronics 406 and may transmit the measurements to the data acquisition unit 408. If the receivers 1-N each corresponds to a multi-component receiver, the measurements receiver at the control unit 402 may be combined, multi-component measurements including information of multiple orthogonal directions. If the receivers 1-N each corresponds to a different orthogonal receiver, on the other hand, the measurements received at the control unit 402 may comprise orthogonally specific measurements. In certain embodiments, the orthogonally specific measurements may be combined at the receiver electronics before being sent to the control unit 402. For a specific transmitter excitation, measurements from multiple receivers can be generated and received at the same time. Similarly, multiple transmitters 1-N can be excited at the same time and they can be time, frequency or jointly multiplexed for latter demultiplexing operation at the receivers. Upon reception at the data acquisition unit 408, the measurements may be digitized, stored in a data buffer 410, preprocessed at data processing unit 412, and sent to the surface 414 through a communication unit 416, which may comprise a downhole telemetry system.

In certain embodiments, the control center 402 may select the combinations of the transmitters and receivers to use to make measurements. The control unit 402 may comprise a set of instructions and may generate control signals to the transmitter and receiver electronics based, at least in part, on the instructions. For example, the control unit 402 may issue control signals to the transmitter and receivers to take different types of measurements within certain time periods. Example types of measurements include measurements with low-depth of investigations, medium depth of investigation, and high depth of investigation.

According to aspects of the present disclosure, the resulting measurements from the multi-component conformable sensors may be aggregated and processed to determine at least one characteristic of one or more downhole elements. In certain embodiments, aggregating and processing the measurements may comprise aggregating and processing the measurements using a control unit located either within the downhole tool or the surface above the downhole tool. When processed at the surface, the measurements may be communicated to the surface in real time, such as through a wireline, or stored in a downhole tool and later processed when the tool is retrieved to the surface. The steps to perform the aggregation and processing may stored as a set of instructions in a memory device of the control unit such that a processor of the control unit performs the steps when it executes the instructions. In certain embodiments, a visualization of the one or more downhole elements may be generated based, at least in part, on the determined characteristic.

In certain embodiments, processing the measurements may comprise processing the measurements using an inversion algorithm. The inversion algorithm may be specific to the environment in which the downhole tool is used (cased or open hole) and may be designed to calculate parameters unique to the environment. For example, the inversion algorithm may be designed to return parameters regarding one or more pipes in a downhole environment with concentric casings. As used herein, an inversion algorithm may be implemented as a set of instructions in control unit. The set of instructions, when executed by the processor of the control unit, may cause the processor to perform data calculations and manipulations necessary for the inversion algorithm.

Figure 5:
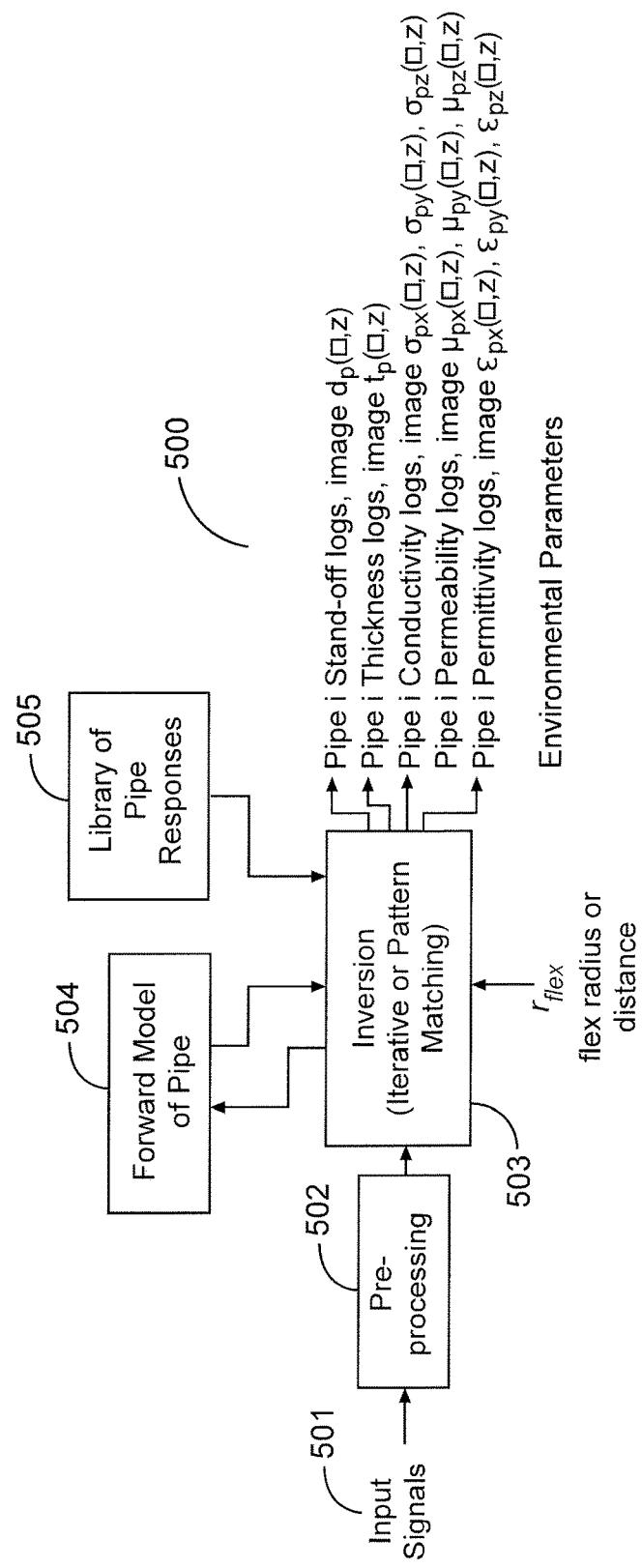
FIG. 5 is a block diagram of an example inversion algorithm for a downhole environment with one or more pipes, according to aspects of the present disclosure.

FIG. 5 is a block diagram on an example inversion algorithm for a downhole environment with concentric casings, according to aspects of the present disclosure. An input signal 501 may comprise measurements from the receivers of the downhole tool, including multi-component receivers of multi-component conformable sensor. In certain embodiments, the input signals may be divided into time components and may be identified by the multi-component receiver which made the measurement and the transmitter that generated the eddy current/secondary current measured by the receiver. The measurements may also be identified by the pipe to which they correspond, when measurements on multiple pipe are taken.

The inversion algorithm may comprise a pre-processing block 502, which may receive the input signals 501. The pre-processing block 502 may process the input signals to compensate for downhole conditions or to convert the input signals to a form usable within the inversion block 503. For example, the pre-processing block 502 may process the measurements to calibrate for temperature effects, convert between frequency and time domains, convert between complex-value to phase and amplitudes, and/or to remove noise by filtering in azimuth or depth.

The inversion algorithm further may comprise an inversion block 503, which may receive and process the signals from the pre-processing block 502 to determine parameters for one or more of the pipes in the downhole environment. In certain embodiments, the inversion block 503 may receive a model 504 of a downhole environment with one or more pipes. The inversion block 503 may implement a cost function to determine pipe parameters that produce the minimum mismatch between the model 504 and the input signals 501, examples of which are described below.

In certain embodiments, a library 505 of pipe responses to different signals can be used instead of or in addition to the model 504. For example, the library 505 may be used if the parameter dimensions of the casing responses are low in number and also small in range, so that an accurate library can be calculated. If library 505 is used, a multi-dimensional interpolation can be used to obtain the pipe parameters closest to the measurements reflected in the input signal 501.

The inversion block 503 may output one of more pipe parameters determined using the cost function. The parameters may comprise physical parameters, such as the stand-off distances between the sensors and the pipes and the thicknesses of the pipes, as well as electrical parameters of the pipes, such as conductivity, permeability, and permittivity. Notably, the use of multi-component conformable sensors allows for a large number of independent measurements to be used to solve for bi-axial or uni-axial anisotropy in the conductivity, permeability or permittivity parameters of the pipes. These anisotropic parameters can be used to better estimate parameters of the pipe such as stresses. Visualizations of the parameters can be generated and used to identify features of the pipe, such as cracks and corrosion. Notably, because of the resolution of the multi-component conformable sensors, the resulting visualizations may have high resolution and azimuthal sensitivity, indicating very small changes in the pipe parameters that correspond to very small features (on the order of 0.1 inches) on the pipe in direct contact with the multi-component conformable sensor.

In a multi-pipe environment, where measurements are made on more than one pipe, the resulting measurements may be indexed to identify the corresponding pipe. Notably, the resolution of the measurements and resulting images for each pipe decreases the further the pipe is away from the multi-component conformable sensor, due to the increasing stand-off of between the pipe and the transmitters and receivers of the multi-component conformable sensors. However, the use of multi-component conformable sensors provides more data points through which to better estimate parameters of the additional pipes.

In certain embodiments, the downhole tool may make measurements as it is lowered to different depths within the casing, collecting more data points. In certain embodiments, these points can be combined to form a log of the casing, providing an image of the entire casing, rather than one axial portion. Alternatively, discrete azimuthal measurements from each depth can be combined to obtain a visualization of the casing. In addition to the casing parameters, certain environmental parameters, such as temperature, pipe stresses, eccentricity of the tool in the borehole or pipe can be obtained.

Figure 6:
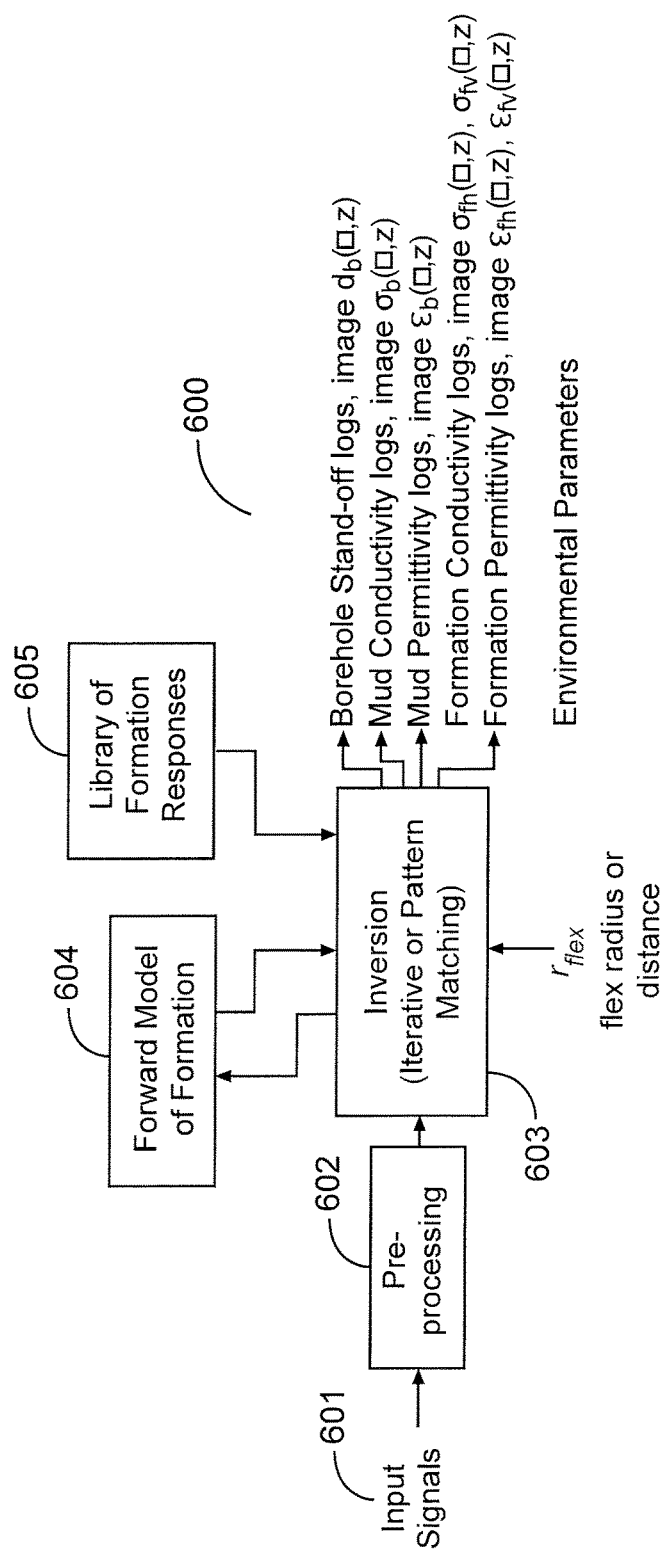
FIG. 6 is a block diagram of an example inversion algorithm for downhole environment without pipes, according to aspects of the present disclosure.

FIG. 6 is a block diagram on an example inversion algorithm for a downhole environment without casing (e.g., open hole), according to aspects of the present disclosure. As can be seen, the inversion algorithm 600 comprises similar features to inversion algorithm 500. For example, the input signals 601 and pre-processing block 602 may be similar to those described with respect to FIG. 5. The inversion block 603 may also be similar, processing the input signals 601 using a model 604 or library 605, with the model 604 or library 605 corresponding to a borehole rather than a casing.

The inversion block 603 may output parameters specific to an open hole environment. For example, the parameters may include physical parameters, such as a stand-off distance between the multi-component conformable sensor and the borehole, and electrical parameters, such as drilling mud conductivity and permittivity, and formation conductivity and permittivity. Shallow measurements made using the multi-component conformable sensors may be used to estimate the electrical properties of drilling fluid within the borehole, and also flushed zone and mud cake in the formation. In certain embodiments, larger sensors with lower resolution can be used to minimize the borehole rugosity effects.

Like the inversion algorithm 500, the inversion algorithm 600 may output logs of parameters that may be visualized to identify features of the borehole. The use of multi-component conformable sensors allows for a large number of independent measurements that can be used to solve for bi-axial or uni-axial anisotropy in conductivity or permittivity of the borehole and surrounding formation. These anisotropic parameters can be used to better evaluate formations characteristics such as lamination.

Figure 8:
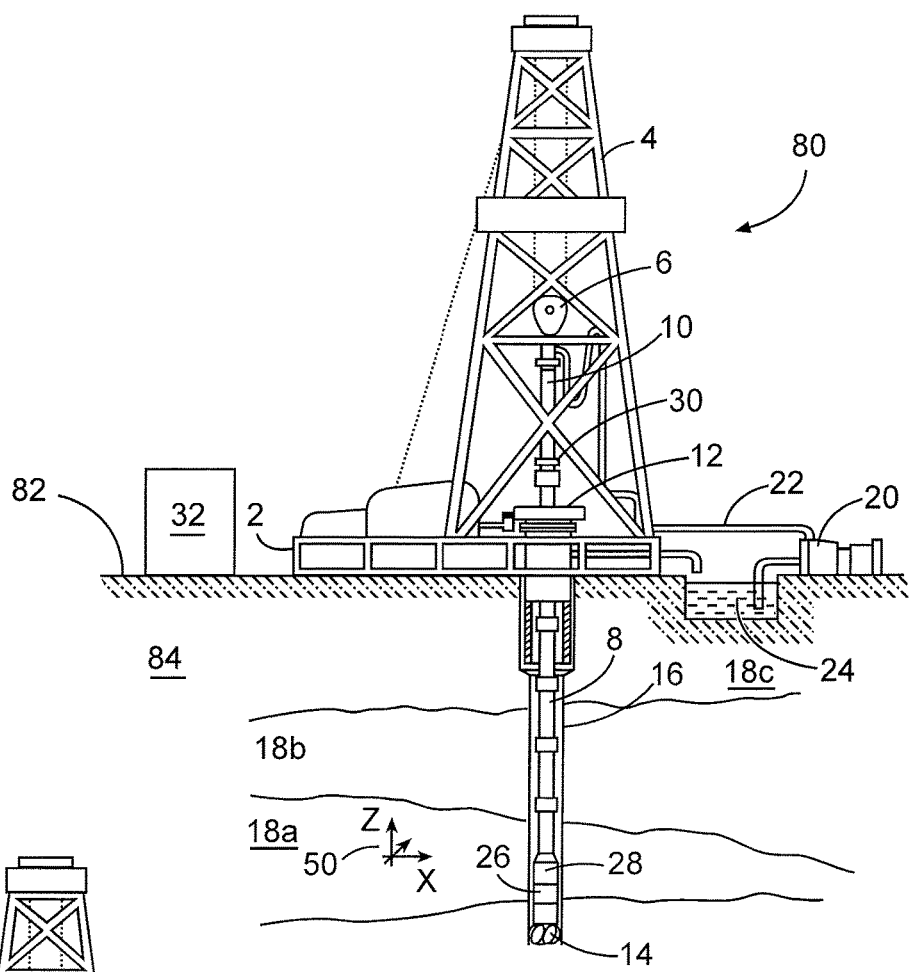
FIG. 8 is a diagram showing an illustrative logging while drilling environment, according to aspects of the present disclosure.

FIG. 8 is a diagram of a subterranean drilling system 80 incorporating a downhole tool 26 with multi-conformable sensors, according to aspects of the present disclosure. The drilling system 80 comprises a drilling platform 2 positioned at the surface 82. In the embodiment shown, the surface 102 comprises the top of a formation 104 containing one or more rock strata or layers 18a-c, and the drilling platform 2 may be in contact with the surface 102. In other embodiments, such as in an off-shore drilling operation, the surface 82 may be separated from the drilling platform 2 by a volume of water.

The drilling system 80 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16.

The drilling system 80 may comprise a bottom hole assembly (BHA) coupled to the drill string 8 near the drill bit 14. The BHA may comprise various downhole measurement tools and sensors and LWD and MWD elements, including the downhole tool 26 with multi-component conformable sensors. As the bit extends the borehole 16 through the formations 18, the tool 26 may collect measurements relating to borehole 16 and formation the resistivity of the formation 84. In certain embodiments, the orientation and position of the tool 26 may be tracked using, for example, an azimuthal orientation indicator, which may include magnetometers, inclinometers, and/or accelerometers, though other sensor types such as gyroscopes may be used in some embodiments.

The tools and sensors of the BHA including the tool 26 may be communicably coupled to a telemetry element 28. The telemetry element 28 may transfer measurements from tool 26 to a surface receiver 30 and/or to receive commands from the surface receiver 30. The telemetry element 28 may comprise a mud pulse telemetry system, and acoustic telemetry system, a wired communications system, a wireless communications system, or any other type of communications system that would be appreciated by one of ordinary skill in the art in view of this disclosure. In certain embodiments, some or all of the measurements taken at the tool 26 may also be stored within the tool 26 or the telemetry element 28 for later retrieval at the surface 82.

In certain embodiments, the drilling system 80 may comprise a surface control unit 32 positioned at the surface 102. The surface control unit 32 may be communicably coupled to the surface receiver 30 and may receive measurements from the tool 26 and/or transmit commands to the tool 26 though the surface receiver 30. The surface control unit 32 may also receive measurements from the tool 26 when the tool 26 is retrieved at the surface 102. As is described above, the surface control unit 32 may process some or all of the measurements from the tool 26 to determine certain parameters of downhole elements, including the borehole 16 and formation 84, and may also generate visualizations of the borehole 16 and formation 84 based, at least in part, on the determined parameters through which features of the downhole elements, such as cracks and fractures, may be identified.

Figure 9:
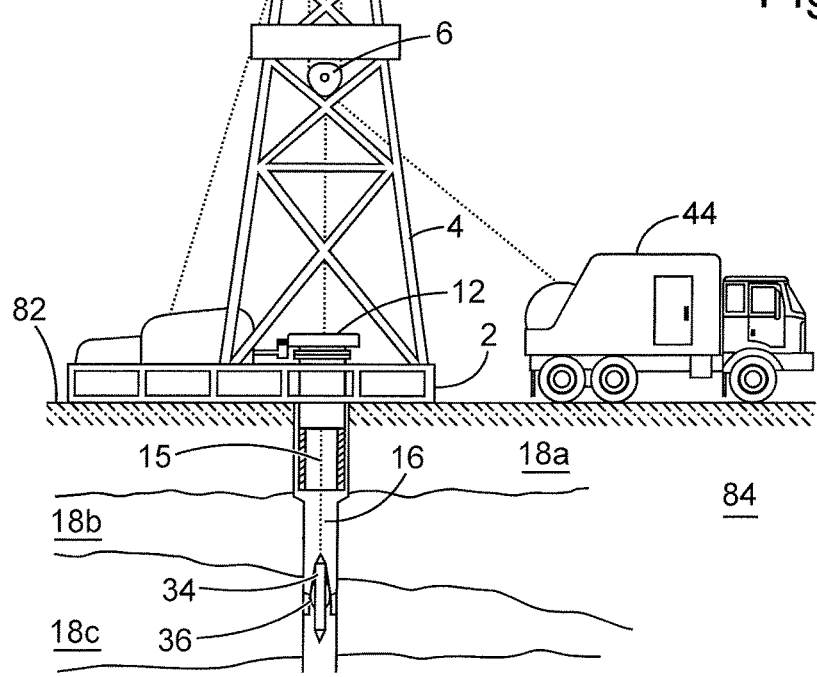
FIG. 9 is a diagram showing an illustrative wireline logging environment, according to aspects of the present disclosure.

At various times during the drilling process, the drill string 8 may be removed from the borehole 16 as shown in FIG. 9. Once the drill string 8 has been removed, measurement/logging operations can be conducted using a wireline tool 34, i.e., an instrument that is suspended into the borehole 16 by a cable 15 having conductors for transporting power to the tool and telemetry from the tool body to the surface 102. The wireline tool 34 may comprise a downhole tool 36 having multi-component conformable sensors, similar to the tool 26 described above. The tool 36 may be communicatively coupled to the cable 15. A logging facility 44 (shown in FIG. 9 as a truck, although it may be any other structure) may collect measurements from the tool 36, and may include computing facilities (including, e.g., a control unit/information handling system) for controlling, processing, storing, and/or visualizing the measurements gathered by the tool 36. The computing facilities may be communicatively coupled to the tool 36 by way of the cable 15. In certain embodiments, the control unit 32 may serve as the computing facilities of the logging facility 44.

An example downhole tool incorporating aspects of the present disclosure may include a tool body and a first flexible material coupled to the tool body. A transmitter may be coupled to the first flexible material. A receiver may coupled to the first flexible material, with the receiver having at least two antenna windings positioned in different orientations. A control unit may be communicably coupled to the transmitter and the receiver, the control unit having a processor and a memory device coupled to the processor, the memory device containing a set of instruction that, when executed by the processor, cause the processor to generate an electromagnetic signal in a downhole element using the transmitter, and measure a response of the downhole element to the electromagnetic signal using the at least two antenna windings of the receiver. The set of instruction may further cause the processor to determine at least one parameter of the downhole element based, at least in part, on the measured response of the downhole element.

In certain embodiments, the receiver comprises a second flexible material, with the at least two antenna windings disposed on different planar surfaces of the second flexible material. In certain embodiments, the tool may comprise an arm extendable from the tool body and a pad coupled to the arm, wherein the first flexible material is coupled to the pad. In certain embodiments, the transmitter, the receiver, and the first flexible material comprise one of an array of sensors on the pad. In certain embodiments, the different orientations comprise orthogonal directions. In certain embodiments, the receiver comprises three antenna windings oriented in three different orthogonal directions.

According to aspects of the present disclosure, an example method for making downhole measurement includes positioning a tool with a borehole, the tool comprising a first flexible material coupled to a tool body, a transmitter coupled to the first flexible material, and a receiver coupled to the first flexible material, the receiver comprising at least two antenna windings positioned in different orientations. An electromagnetic signal may be generated in a downhole element using the transmitter. A response of the downhole element to the electromagnetic signal may be measured using the at least two antenna windings of the receiver.

In certain embodiments, positioning the tool within the borehole comprises one of positioning the tool within the borehole using a wireline or slickline, or positioning the tool within the borehole using a drill string coupled to the tool. In certain embodiments, the receiver comprises a second flexible material, with the at least two antenna windings disposed on different planar surfaces of the second flexible material. In certain embodiments, generating the electromagnetic signal in the downhole element using the transmitter comprises extending an arm from the tool body to cause the first flexible material to contact the downhole element. In certain embodiments, the transmitter, the receiver, and the first flexible material comprise one of an array of sensors; and measuring the response of the downhole element to the electromagnetic signal using the at least two antenna windings of the receiver comprises measuring the response of the downhole element to the electromagnetic signal using the array of sensors. In certain embodiments, the different orientations comprise orthogonal directions. In certain embodiments, the receiver comprises three antenna windings oriented in three different orthogonal directions.

In any of the embodiments described in the preceding two paragraphs, the method may further comprise determining at least one parameter of the downhole element based, at least in part, on the measured response of the downhole element. Determining at least one parameter of the downhole element based, at least in part, on the measured response of the downhole element may comprise determining at least one parameter of at least one of a borehole, a formation, and a casing secured within a borehole. In certain embodiments, the method may further comprise generating a visualization of the downhole element based, at least in part, on the determined parameter.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are each defined herein to mean one or more than one of the element that it introduces.

What is claimed is:

1. A downhole tool, comprising
   tool body;
   an arm extendable from the tool body;
   a pad coupled to the arm, wherein the arm comprises a tension to establish contact between the pad and a surface of a downhole element and the pad comprises an elasticity, wherein the tension in the arm and the elasticity of the pad are such that the pad deforms to the shape of the surface of the downhole element when the pad contacts the surface of the downhole element;
   a first flexible material coupled to the pad;
   a transmitter coupled to the first flexible material;
   a receiver printed on the first flexible material, the receiver comprising at least two antenna windings positioned in different orientations in a planar, flexible structure, wherein the at least two antenna windings are printed on two sides of the flexible material; and
   wherein the arm extends to establish contact between the pad and the downhole element.

2. The downhole tool of claim 1, wherein the receiver comprises a second flexible material, with the at least two antenna windings disposed on different planar surfaces of the second flexible material.

3. The downhole tool of claim 1, further comprising an array of sensors on the pad, wherein the array of sensors comprises at least the transmitter, the receiver, and the first flexible material.

4. The downhole tool of claim 1, wherein the different orientations comprise orthogonal directions.

5. The downhole tool of claim 4, wherein the receiver comprises three antenna windings oriented in three different orthogonal directions.

6. The downhole tool of claim 1, wherein the transmitter is oriented differently than the receiver.

7. The downhole tool of claim 1, further comprising a control unit communicably coupled to the transmitter and the receiver, the control unit comprising a processor and a memory device coupled to the processor, the memory device containing a set of instruction that, when executed by the processor, cause the processor to
   generate an electromagnetic signal in the downhole element using the transmitter; and
   measure a response of the downhole element to the electromagnetic signal using the at least two antenna windings of the receiver.

8. The downhole tool of claim 7, wherein the set of instruction further causes the processor to determine at least one parameter of the downhole element based, at least in part, on the measured response of the downhole element.

9. The downhole tool of claim 7, wherein the downhole element comprises at least one of a borehole, a formation, and a casing secured within a borehole.

10. A method for making downhole measurement, comprising:
    positioning a tool at least partially within a borehole, the tool comprising
       an arm extendable from a tool body;
       a pad coupled to the arm, wherein the arm comprises a tension to establish contact between the pad and a surface of a downhole element and the pad comprises an elasticity, wherein the tension of the arm and the elasticity of the pad is such that the pad deforms to a shape of the surface of the downhole element when the pad contacts the surface of the downhole element;
       a first flexible material coupled to the pad;
       a transmitter coupled to the first flexible material; and
       a receiver printed on the first flexible material, the receiver comprising at least two antenna windings positioned in different orientations arranged in a planar, flexible structure, wherein the at least two antenna windings are printed on two sides of the flexible material;
    extending the arm to establish contact between the pad and the downhole element;
    generating an electromagnetic signal in the downhole element using the transmitter; and
    measuring a response of the downhole element to the electromagnetic signal using the at least two antenna windings of the receiver.

11. The method of claim 10, wherein positioning the tool at least partially within the borehole comprises one of positioning the tool within the borehole using a wireline or slickline, or positioning the tool within the borehole using a drill string coupled to the tool.

12. The method of claim 10, wherein the receiver comprises a second flexible material, with the at least two antenna windings disposed on different planar surfaces of the second flexible material.

13. The method of claim 10, wherein generating the electromagnetic signal in the downhole element using the transmitter comprises extending an arm from the tool body to cause the first flexible material to contact the downhole element.

14. The method of claim 10, further comprising:
    measuring the response of the downhole element to the electromagnetic signal using the at least two antenna windings of the receiver comprises measuring the response of the downhole element to the electromagnetic signal using an array of sensors, wherein the tool further comprises the array of sensors on the pad, and wherein the array of sensors comprises at least the transmitter, the receiver and the first flexible material.

15. The method of claim 14, wherein the receiver comprises three antenna windings oriented in three different orthogonal directions.

16. The method of claim 10, wherein the different orientations comprise orthogonal directions.

17. The method of claim 10, further comprising determining at least one parameter of the downhole element based, at least in part, on the measured response of the downhole element.

18. The method of claim 17, wherein determining at least one parameter of the downhole element based, at least in part, on the measured response of the downhole element comprises determining at least one parameter of at least one of a borehole, a formation, and a casing secured within a borehole.

19. The method of claim 17, further comprising generating a visualization of the downhole element based, at least in part, on the determined parameter.

* * * * *